United States Patent
Tsukada et al.

(10) Patent No.: US 10,576,959 B2
(45) Date of Patent: Mar. 3, 2020

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventors: Yuta Tsukada, Shizuoka-ken (JP); Yusuke Kitazawa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 197 days.

(21) Appl. No.: 15/896,708

(22) Filed: Feb. 14, 2018

(65) Prior Publication Data

US 2018/0229711 A1 Aug. 16, 2018

(30) Foreign Application Priority Data

Feb. 16, 2017 (JP) ................. 2017-027210

(51) Int. Cl.
| | | |
|---|---|---|
| *B60W 10/08* | (2006.01) | |
| *B60W 20/15* | (2016.01) | |
| *B60K 6/22* | (2007.10) | |
| *B60K 6/365* | (2007.10) | |

(Continued)

(52) U.S. Cl.
CPC ............... *B60W 10/08* (2013.01); *B60K 6/22* (2013.01); *B60K 6/365* (2013.01); *B60K 6/445* (2013.01); *B60W 20/15* (2016.01); *B60W 30/20* (2013.01); *B60W 2030/206* (2013.01); *B60W 2400/00* (2013.01); *B60W 2710/0666* (2013.01); *B60W 2710/085* (2013.01); *Y02T 10/6239* (2013.01);

(Continued)

(58) Field of Classification Search
CPC .......... B60K 6/445; B60K 6/365; B60K 6/22; Y02T 10/6286; Y02T 10/6239; Y02T 10/7077
See application file for complete search history.

(56) References Cited

U.S. PATENT DOCUMENTS

| | | | |
|---|---|---|---|
| 2012/0239237 A1* | 9/2012 | Hashimoto | ............ B60K 6/365 |
| | | | 701/22 |
| 2016/0304084 A1* | 10/2016 | Kawai | .................... B60W 20/17 |
| 2016/0375894 A1* | 12/2016 | Kawai | .................... B60K 6/445 |
| | | | 701/22 |

FOREIGN PATENT DOCUMENTS

| | | |
|---|---|---|
| JP | H0255845 A | 2/1990 |
| JP | H11-350997 A | 12/1999 |
| JP | 2000170589 A | 6/2000 |

(Continued)

*Primary Examiner* — Russell Frejd
(74) *Attorney, Agent, or Firm* — Hunton Andrews Kurth LLP

(57) ABSTRACT

A control apparatus for a hybrid vehicle is configured to control the hybrid vehicle. The control apparatus is provided with: an arithmetic operator configured to arithmetically operate a pulsation compensating torque for compensating a pulsation component; an arithmetic operation controller configured to control the arithmetic operator (i) to arithmetically operate the pulsation compensating torque in a first cycle in a period that does not include a vertex portion in which the pulsation compensating torque is locally maximal or locally minimal and (ii) to arithmetically operate the pulsation compensating torque in a second cycle, a length of which is shorter than that of the first cycle, in a period that includes the vertex portion; and a torque controller configured to control the electric motor to output a torque including the pulsation compensating torque arithmetically operated by the arithmetic operator.

3 Claims, 11 Drawing Sheets

(51) Int. Cl.
  *B60K 6/445*       (2007.10)
  *B60W 30/20*       (2006.01)
(52) U.S. Cl.
  CPC ........ *Y02T 10/6286* (2013.01); *Y02T 10/7077* (2013.01)

(56) References Cited

FOREIGN PATENT DOCUMENTS

| JP | 2008180105 A | 8/2008 |
| JP | 2010-023790 A | 2/2010 |

\* cited by examiner

CONTROL APPARATUS FOR HYBRID VEHICLE

CROSS-REFERENCE TO RELATED APPLICATIONS

This application is based upon and claims the benefit of priority of the prior Japanese Patent Application No. 2017-027210, filed on Feb. 16, 2017, the entire contents of which are incorporated herein by reference.

BACKGROUND

1. Technical Field

Embodiments of the present disclosure relate to a control apparatus for a hybrid vehicle, configured to suppress, for example, an influence of a torque pulsation of an internal combustion engine.

2. Description of the Related Art

For this type of apparatus, there is known an apparatus configured to suppress a torque pulsation, which is derived from an explosion cycle of an internal combustion engine. For example, Japanese Patent Application Laid Open No. Hei 11-350997 (Patent Literature 1) proposes a technique/technology in which a torque fluctuation, which is generated on an output shaft in accordance with an inertia torque and an output torque of the internal combustion engine, is compensated by a torque outputted from an electric motor. Moreover, Japanese Patent Application Laid Open No. 2010-023790 (Patent Literature 2) proposes a technique/technology in which a compensating torque for removing a pulsation component from a drive shaft torque is calculated and the compensating torque is subtracted from a torque command value of an electric motor, thereby correcting the torque command value of the electric motor.

In the techniques/technologies described in the Patent Literatures 1 and 2, it is required to arithmetically operate an appropriate compensating torque. If, however, the compensating torque to be outputted has a high frequency, some calculation cycle of the compensating torque possibly does not provide sufficient time resolution, and as a result, the appropriate compensating torque cannot be outputted. In this case, the torque pulsation cannot be appropriately suppressed. Moreover, the compensating torque includes a frequency other than a target frequency, for example, due to an unintentional reduction in the compensating torque. This frequency component may match a natural frequency of a damper, and that may cause new vibration.

Setting a high-frequency calculation cycle of the compensating torque all the time possibly increases a compensating torque calculation performance; however, in this case, that may cause a new problem of significantly increasing a processing load of an arithmetic operation apparatus.

SUMMARY

In view of the aforementioned problems, it is therefore an object of embodiments of the present disclosure to provide a control apparatus for a hybrid vehicle that can suppress an influence of a torque fluctuation of an internal combustion engine.

The above object of embodiments of the present disclosure can be achieved by a first control apparatus for a hybrid vehicle, configured to control the hybrid vehicle, which includes an internal combustion engine as a power source and an electric motor configured to output a torque to an output shaft of the internal combustion engine, the control apparatus provided with: an arithmetic operator configured to arithmetically operate a pulsation compensating torque for compensating a pulsation component, which is generated on the output shaft of the internal combustion engine; an arithmetic operation controller configured to control the arithmetic operator (i) to arithmetically operate the pulsation compensating torque in a first cycle in a period that does not include a vertex portion in which the pulsation compensating torque is locally maximal or locally minimal and (ii) to arithmetically operate the pulsation compensating torque in a second cycle, a length of which is shorter than that of the first cycle, in a period that includes the vertex portion; and a torque controller configured to control the electric motor to output a torque including the pulsation compensating torque arithmetically operated by the arithmetic operator.

According to the first control apparatus for the hybrid vehicle in the present disclosure, the calculation cycle of the pulsation compensating torque is controlled to be shorter in the period that includes the vertex portion in which the pulsation compensating torque is locally maximal or locally minimal, than that in the period that does not include the vertex portion. As a result, the pulsation compensating torque is arithmetically operated as a more accurate value in the vicinity of the vertex portion. In particular, it is possible to prevent that the pulsation compensating torque includes an unintentional frequency component due to a reduction in the torque. This makes it possible to prevent that a frequency component of the pulsation compensating torque matches a natural frequency of a mechanical system, such as a damper, and to prevent that that new vibration occurs in the hybrid vehicle.

Moreover, in embodiments of the present disclosure, it is only in the period that includes the vertex portion, that the calculation period of the damping torque is controlled to be short. It is thus possible to suppress a calculation load increase, more effectively, for example, than when the calculation period is controlled to be short all the time.

In one aspect of the first control apparatus for the hybrid vehicle according to the present disclosure, the torque controller is configured (i) to control the electric motor in a third cycle including a plurality of second cycles and (ii) to set a maximum value, out of a plurality of pulsation compensating torques respectively arithmetically operated in the plurality of second cycles included in the third cycle, as the pulsation compensating torque and to control the electric motor in the period that includes the vertex portion.

According to this aspect, in the period that includes the vertex portion, the pulsation compensating torque is arithmetically operated in a short cycle, while the torque control of the electric motor (i.e. the control of outputting the pulsation compensating torque) is performed in a relatively long cycle. It is thus possible to prevent that a reduction in the calculation period of the pulsation compensating torque causes an increase in a processing load regarding the torque control. Moreover, in the period that includes the vertex portion, the maximum value out of the plurality of pulsation compensating torques arithmetically operated (or more accurately, a value with a maximum absolute value) is outputted. Thus, the reduction in the torque can be prevented.

The above object of embodiments of the present disclosure can be achieved by a second control apparatus for a hybrid vehicle, configured to control the hybrid vehicle, which includes an internal combustion engine as a power source and an electric motor configured to output a torque to an output shaft of the internal combustion engine, said control apparatus provided with: an arithmetic operator configured to arithmetically operate a pulsation compensating torque for compensating a pulsation component, which is generated on the output shaft of the internal combustion engine; a torque controller configured to control the electric motor (i) to output a torque including the pulsation compensating torque arithmetically operated by said arithmetic operator in a period that does not include a vertex portion in which the pulsation compensating torque is locally maximal or locally minimal and (ii) to output a torque including the maximum pulsation compensating torque that can be arithmetically operated by said arithmetic operator, in a period that includes the vertex portion.

According to the second control apparatus for the hybrid vehicle in the present disclosure, the maximum value that can be arithmetically operated by the arithmetic operator (or more accurately, a value with a maximum absolute value) is set as the pulsation compensating torque in the period that includes the vertex portion in which the pulsation compensating torque is locally maximal or locally minimal. Thus, the reduction in the torque can be certainly prevented. It is also possible to prevent that the pulsation compensating torque includes an unintentional frequency component. Moreover, the calculation period of the pulsation compensating torque is not changed, and the calculation load is thus not increased.

The nature, utility, and further features of this disclosure will be more clearly apparent from the following detailed description with reference to embodiments of the disclosure when read in conjunction with the accompanying drawings briefly described below.

DETAILED DESCRIPTION OF THE EMBODIMENTS

Hereinafter, embodiments of the present disclosure will be explained with reference to the drawings.

First Embodiment

A control apparatus for a hybrid vehicle according to a first embodiment will be explained with reference to FIG. 1 to FIG. 6.

<Configuration of Hybrid Vehicle>

Figure 1:
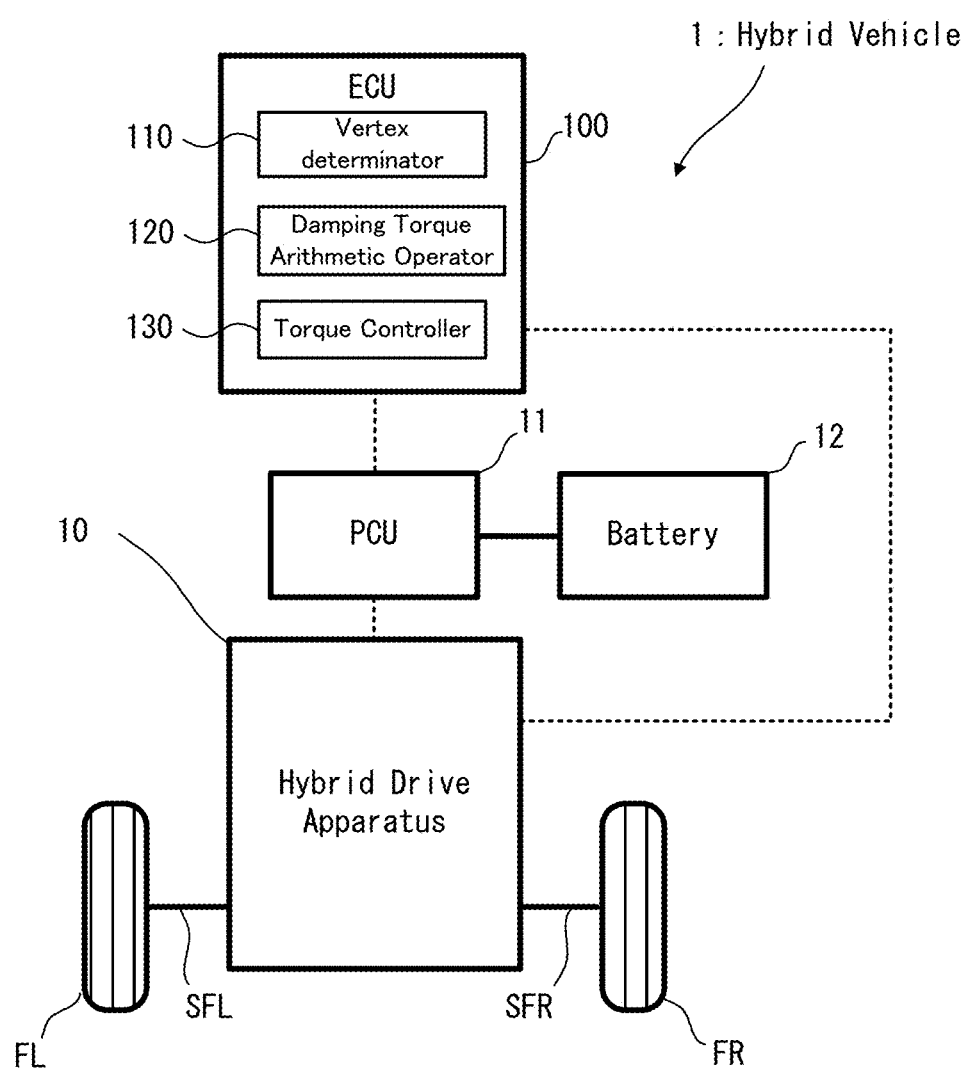
FIG. 1 is a schematic diagram illustrating an entire configuration of a hybrid vehicle according to a first embodiment.

Firstly, with reference to FIG. 1, an explanation will be given to a configuration of a hybrid vehicle on which the control apparatus for the hybrid vehicle according to the first embodiment is mounted. FIG. 1 is a schematic diagram illustrating an entire configuration of the hybrid vehicle according to the first embodiment;

As illustrated in FIG. 1, a hybrid vehicle 1 according to the first embodiment is provided with an electronic control unit (ECU) 100, a power control unit (PCU) 11, a battery 12, and a hybrid drive apparatus 10.

The ECU 100 is one specific example of the "control apparatus for the hybrid vehicle", and is provided with a central processing unit (CPU), a read only memory (ROM), a random access memory (RAM) and the like. The ECU 100 is an electronic control unit configured to control the operation of each part of the hybrid vehicle 1. The ECU 100 is configured to perform various controls in the hybrid vehicle 1, for example, in accordance with a control program stored in the ROM or the like. The ECU 100 according to the first embodiment is provided with a vertex determinator 110, a damping torque arithmetic operator 120, and a torque controller 130, as processing blocks or hardware realized in the ECU 100. A process performed by each part of the ECU 100 will be detailed in Explanation of Operation later.

The PCU 11 includes a not-illustrated inverter, which is configured to convert direct current (DC) power extracted from the battery 12 to alternating current (AC) power and supply it to motor generators MG1 and MG2, and which is configured to convert AC power generated by the motor generators MG1 and MG2 to DC power and supply it to the battery 12. In other words, the PCU 11 is a power control unit configured to control input/output of an electric power between the battery 12 and each motor generator, or configured to control input/output of an electric power between the motor generators (i.e. the electric power is transmitted and received between the motor generators without via the battery 12 in this case). The PCU 11 is electrically connected to the ECU 100, and the operation of the PCU 11 may be controlled by the ECU 100.

The battery 12 may function as an electric power supply associated with an electric power for power running of the motor generators MG1 and MG2. The battery 12 is a chargeable secondary battery, and is configured to charge with an electric power generated by regeneration of the motor generators MG1 and MG2 or the like. A storage amount of the battery 12 may be detected by the ECU 100 or the like.

Figure 2:
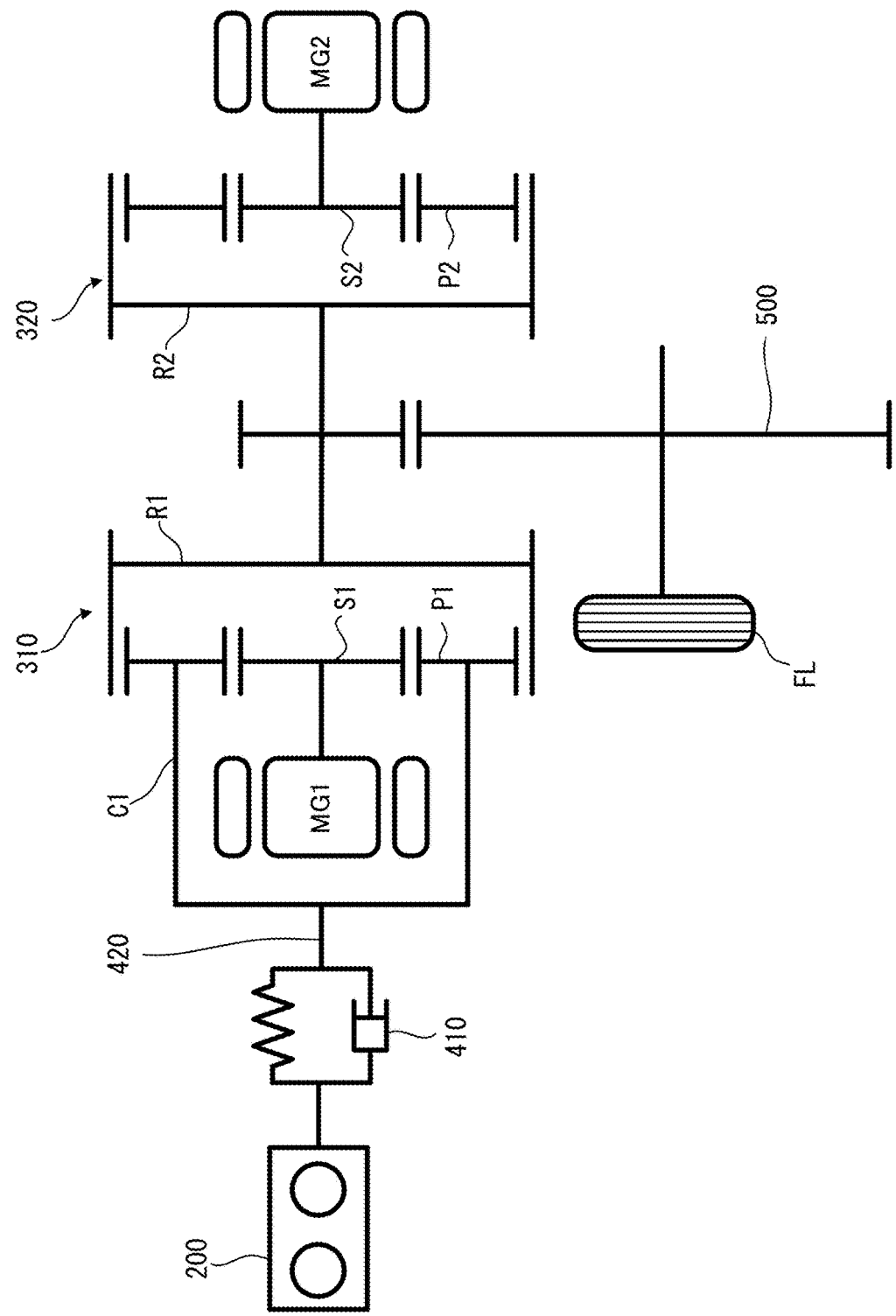
FIG. 2 is a schematic block diagram conceptually illustrating a configuration of a hybrid drive apparatus according to the first embodiment.

The hybrid drive apparatus 10 is a power unit, which functions as a power train of the hybrid vehicle 1. Now, with reference to FIG. 2, a detailed configuration of the hybrid drive apparatus 10 will be explained. FIG. 2 is a schematic block diagram conceptually illustrating the configuration of the hybrid drive apparatus according to the first embodiment.

As illustrated in FIG. 2, the hybrid drive apparatus 10 is provided mainly with an engine 200, a MG1-side power transmission mechanism 310, a MG2-side power transmission mechanism 320, a torsional damper 410, the motor generator MG1 (hereinafter simply referred to as "MG1" as occasion demands), the motor generator MG2 (hereinafter simply referred to as "MG2" as occasion demands), an input shaft 420, and a drive shaft 500.

The engine 200 is one specific example of the "internal combustion engine", and may be a gasoline engine, which functions as a main power source of the hybrid vehicle 1. The engine 200 is configured to enable combustion of an air-fuel mixture via an ignition operation by an ignition apparatus in which a part of a spark plug is exposed in a combustion chamber in a cylinder, and is configured to convert reciprocating motion of a piston, which is generated in accordance with an explosive force by the combustion, to rotational motion of a crankshaft via a connecting rod. An angle of the crankshaft (i.e. a crank angle) can be detected by a crank angle sensor or the like. The engine 200 is configured to output a power to the MG1-side power transmission mechanism 310 via the torsional damper 410 and the input shaft 420.

The MG1-side power transmission mechanism 310 is provided with: a sun gear S1 provided in a central part; a ring gear R1 coaxially provided on an outer circumference of the sun gear S1; a plurality of pinion gears P1 arranged between the sun gear S1 and the ring gear R1 and revolving and rotating on the outer circumference of the sun gear S1; and a carrier C1 pivotally supporting respective rotation shafts of the pinion gears. The sun gear S1 is coupled with a rotor of the MG1 via a sun gear shaft. Moreover, the ring gear R1 is coupled with the drive shaft 500. Furthermore, the carrier C1 is coupled with the input shaft 420 of the engine 200.

The MG2-side power transmission mechanism 320 is provided with: a sun gear S2 provided in a central part; a ring gear R2 coaxially provided on an outer circumference of the sun gear S2; and a plurality of pinion gears P2 arranged between the sun gear S2 and the ring gear R2 and revolving and rotating on the outer circumference of the sun gear S2. The sun gear S2 is coupled with a rotor of the MG2 via a sun gear shaft. Moreover, the ring gear R2 is coupled with the drive shaft 500.

The motor generator MG1 is one specific example of the "electric motor", and may be a motor generator, which has a power running function for converting electrical energy to kinetic energy and a regeneration function for converting kinetic energy to electrical energy. The motor generator MG1 according to the first embodiment is particularly configured to output a damping torque, which is one specific example of the "pulsation compensating torque", to the input shaft 420 configured to transmit a torque from the engine 200. The damping torque is outputted as a torque for compensating (or cancelling) a torque pulsation corresponding to an explosion primary frequency of the engine.

The motor generator MG2 is a motor generator, which has a power running function for converting electrical energy to kinetic energy and a regeneration function for converting kinetic energy to electrical energy, as in the motor generator MG1.

Each of the motor generators MG1 and MG2 is configured, for example, as a synchronous motor generator, and is provided, for example, with a rotor having a plurality of permanent magnets on an outer circumferential surface, and a stator around which a three-phase coil for forming a rotating magnetic field is wound. Of course, the motor generators MG1 and MG2 may have another configuration.

The drive shaft 500 is coupled with drive shafts SFR and SFL (refer to FIG. 1) configured to respectively drive a front right wheel FR and a front left wheel FL, which are drive wheels of the hybrid vehicle 1, <Problem that Occurs in Outputting Damping Torque>

Figure 3:
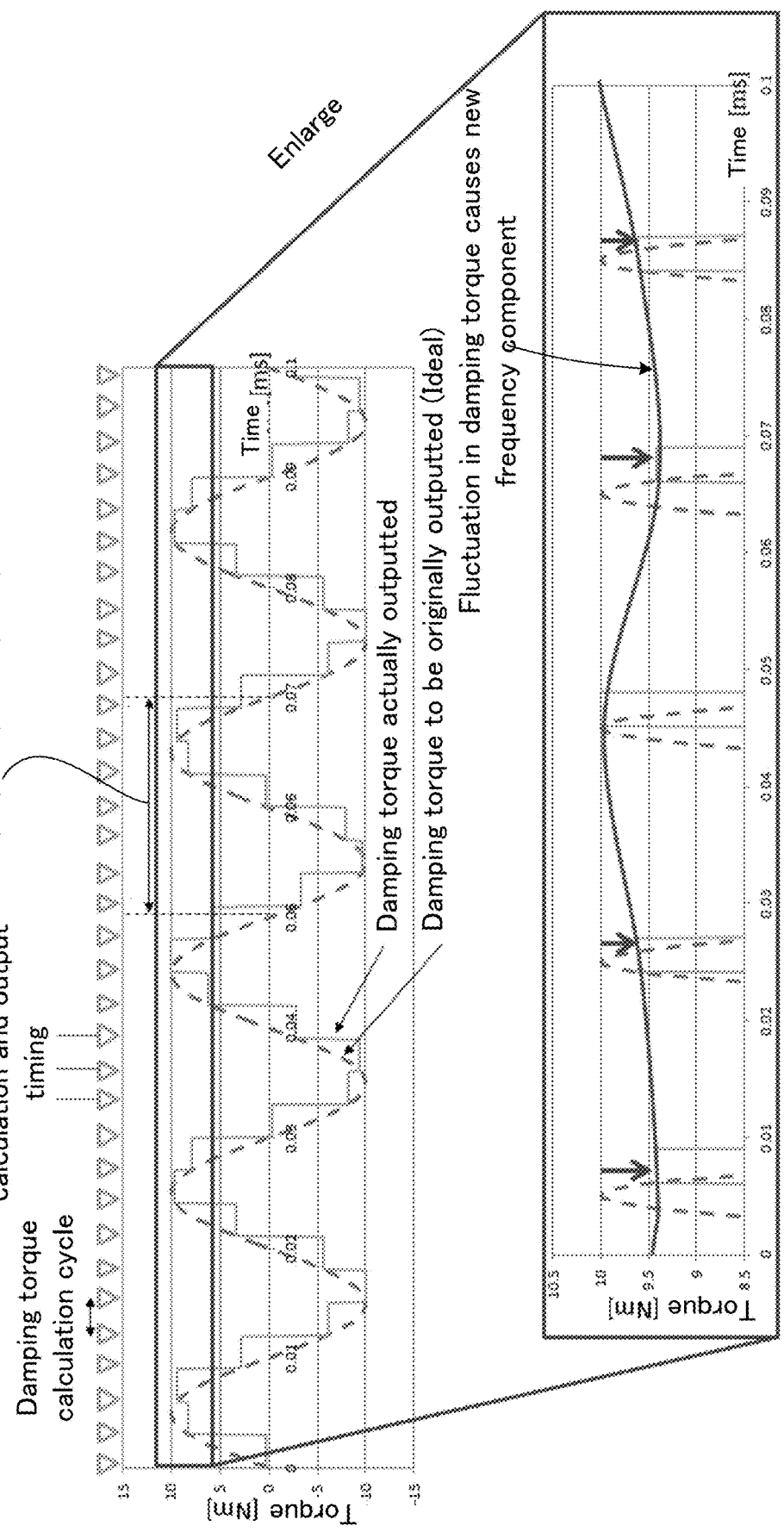
FIG. 3 is a diagram illustrating a problem caused by a reduction in a damping torque.

Next, a problem that occurs in outputting the damping torque, which is to be suppressed by the control apparatus for the hybrid vehicle according to the first embodiment, will be specifically explained with reference to FIG. 3. FIG. 3 is a diagram illustrating a problem caused by a reduction in the damping torque.

As illustrated in FIG. 3, the damping torque is arithmetically operated and outputted on the basis of a torque map (refer to a dashed line), which is set in advance in accordance with a torque pulsation that occurs in the engine 200. The damping torque is outputted, for example, at a frequency corresponding to the explosion primary vibration of the engine 200 (=720 degrees C.A/the number of cylinders). The damping torque is arithmetically operated and outputted at a time corresponding to a predetermined calculation cycle. Thus, if the calculation cycle is set to be relatively long, a damping torque actually outputted does not have an ideal waveform as illustrated in the torque map.

In particular, in a vicinity of a vertex at which the damping torque is locally maximal, calculation timing of the damping torque does not match timing in which the damping torque has a peak on the torque map, so that a maximum value in each cycle of the damping torque varies. Specifically, the damping torque is reduced in each cycle, and a reduction amount differs every cycle. Thus, the maximum value (or local maximum) of the torque outputted in each cycle varies. Such a torque fluctuation may cause a new frequency component to be generated in the damping torque. If the frequency component matches a natural frequency of a mechanical system, such as the torsional damper 410, there is a possibility that unintentional vibration occurs in the hybrid vehicle 1. This problem may occur more often with increasing number of revolutions of the engine 200.

The ECU 100, which is the control apparatus for the hybrid vehicle according to the embodiment, is configured to arithmetically operate and output the damping torque in a method detailed below, in order to solve the aforementioned problem.

The aforementioned problem may occur in the same manner even in a vicinity of a vertex at which the damping torque is locally minimal. In other words, the same problem may occur even when the damping torque is negative. In the following explanation of operation, for convenience of explanation, an explanation will be given only to the vicinity of the vertex at which the damping torque is locally maximal. The same operation, however, may be performed even on the vicinity of the vertex at which the damping torque is locally minimal. Even in that case, the same technical effect as in the embodiment explained below can be obtained.

<Explanation of Operation>

Figure 4:
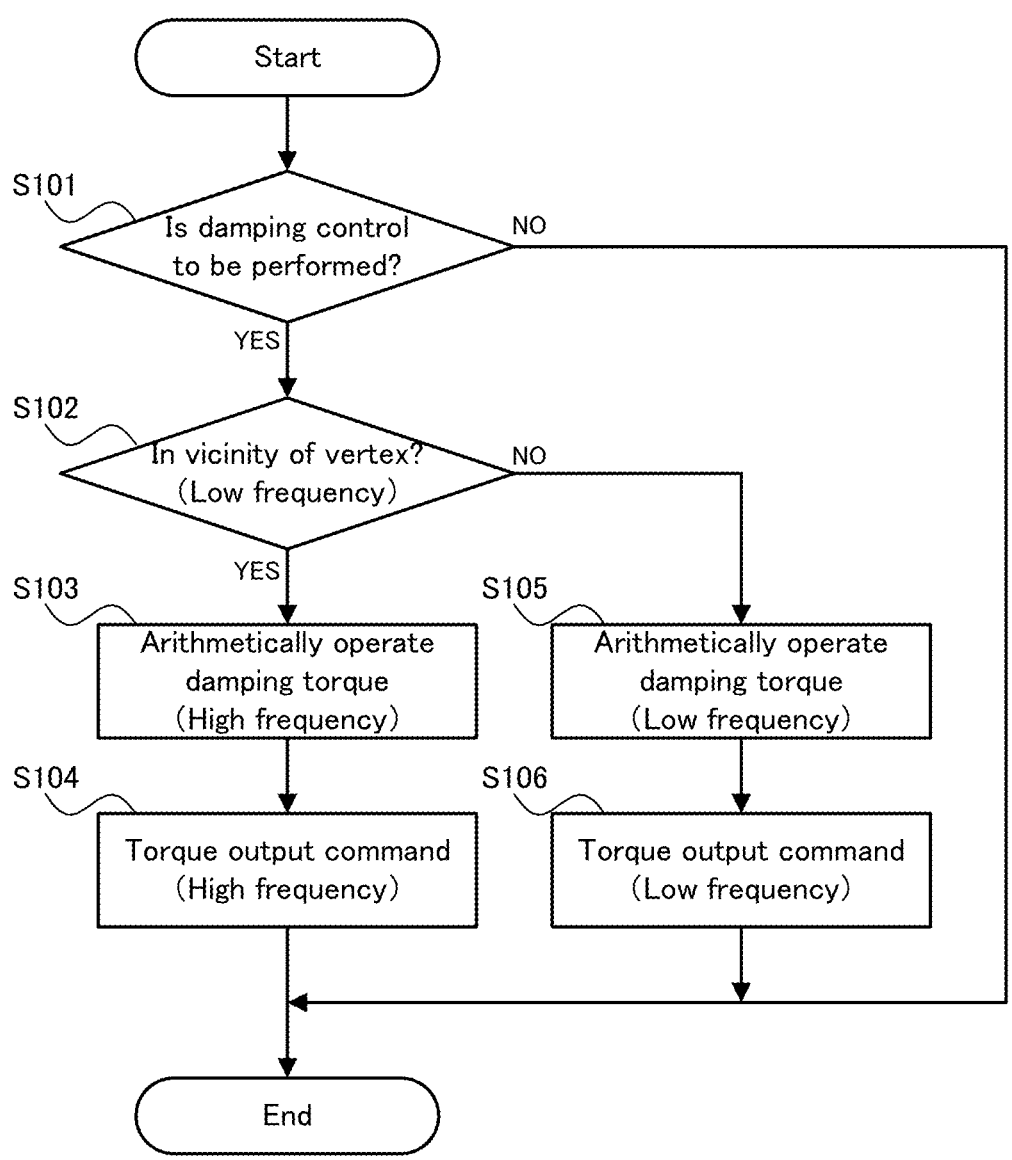
FIG. 4 is a flowchart illustrating a flow of the operation of a control apparatus for the hybrid vehicle according to the first embodiment.

The operation of the control apparatus for the hybrid vehicle according to the first embodiment will be explained in detail with reference to FIG. 4. FIG. 4 is a flowchart illustrating a flow of the operation of a control apparatus for the hybrid vehicle according to the first embodiment.

As illustrated in FIG. 4, in operation of the control apparatus for the hybrid vehicle according to the first embodiment, it is firstly determined whether or not a control of outputting the damping torque from the motor generator MG1 (hereinafter referred to as a "damping control" as occasion demands) is to be performed (step S101). Whether or not the damping control is to be performed, may be set, for example, by a switch operation of a user, or may be automatically set in accordance with a running state of the vehicle. If it is determined that the damping control is not to be performed (the step S101: NO), the subsequent process is omitted and a series of process steps is ended. In this case, the process may be restarted from the step S101 after a lapse of a predetermined period.

Figure 5:
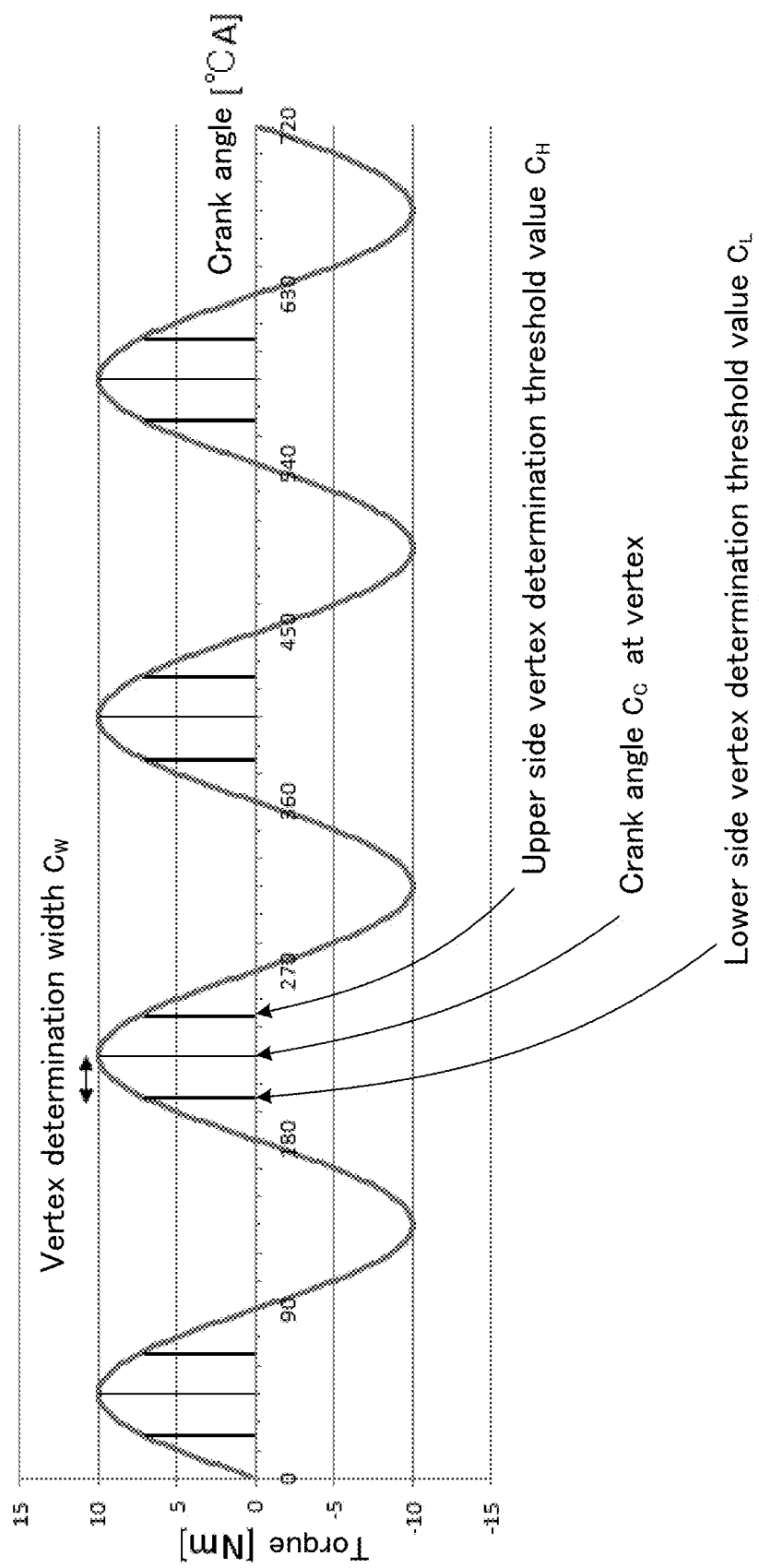
FIG. 5 is a diagram illustrating a method of determining a vicinity of a vertex of the damping torque according to the first embodiment.

If it is determined that the damping control is to be performed (the step S101: YES), the vertex determinator 110 determines whether or not the damping torque to be outputted is in the vicinity of the vertex at which the damping torque is locally maximal (step S102). Hereinafter, a method of determining the vicinity of the vertex will be specifically explained with reference to FIG. 5. FIG. 5 is a diagram illustrating the method of determining the vicinity of the vertex of the damping torque according to the first embodiment.

As illustrated in FIG. 5, a torque map indicating the damping torque to be outputted is set as a map indicating a correspondence relation between the crank angle of the engine 200 and the damping torque. Thus, the use of the torque map provides a crank angle $C_C$ when the damping torque is at the vertex. In other words, the crank angle $C_C$ at the vertex is determined as a constant when the torque map is prepared.

Whether or not the damping torque is in the vicinity of the vertex is determined by determining whether or not a current crank angle is within a predetermined determination width $C_W$ centered on the crank angle $C_C$ at the vertex. More specifically, the damping torque is determined to be in the vicinity of the vertex if the current crank angle is greater than or equal to a lower side vertex determination threshold value $C_L$, which is obtained by subtracting the predetermined determination width $C_W$ from the crank angle $C_C$ at the vertex, and if the current crank angle is less than or equal to an upper side vertex determination threshold value $C_H$, which is obtained by adding the predetermined determination width $C_W$ to the crank angle $C_C$ at the vertex. On the other hand, the damping torque is determined to be not in the vicinity of the vertex if the current crank angle is less than the lower side vertex determination threshold value $C_L$, or if the current crank angle is greater than the upper side vertex determination threshold value $C_H$.

Here, the determination width $C_W$ may be calculated by using the following calculating formula (1) so that a period in which the damping torque is determined to be in the vicinity of the vertex (i.e. a range of the crank angle) is set as short as possible, even though the vertex can be certainly detected.

$$\text{Determination width } C_W[° CA] = \text{Current number of engine revolutions [rpm]}/60 \times \text{Vertex determination processing cycle[sec]} \times 360[° CA] \quad (1)$$

In the first embodiment, the calculation cycle (or processing cycle) can be switched between a low-frequency cycle and a high-frequency cycle, as detailed later. The aforementioned vertex determination is performed at a low frequency.

Back in FIG. 4, if it is determined that the damping torque to be outputted is in the vicinity of the vertex (the step S102: YES), the damping torque arithmetic operator 120 arithmetically operates the damping torque at the high frequency (step S103), and the torque controller 130 outputs an output command of the arithmetically operated damping torque at the high frequency (step S104). The steps S103 and S104 are performed at the high frequency. Thus, each of the steps is performed a plurality of times when the determination in the step S102 at the low frequency is performed once.

On the other hand, if it is determined that the damping torque to be outputted is not in the vicinity of the vertex (the step S102: NO), the damping torque arithmetic operator 120 arithmetically operates the damping torque at the low frequency (step S105), and the torque controller 130 outputs the output command of the arithmetically operated damping torque at the low frequency (step S106). The low frequency is one specific example of the "first cycle", and is set, for example, as 2.5 msec. The high frequency is one specific example of the "second cycle", and is set, for example, as 0.5 msec. The damping torque is arithmetically operated from the current crank angle by using the torque map. In arithmetically operating the damping torque, there may be also performed various processes, such as a gain process, a power limit process, a torque limit process, and a rate limit process.

Figure 6:
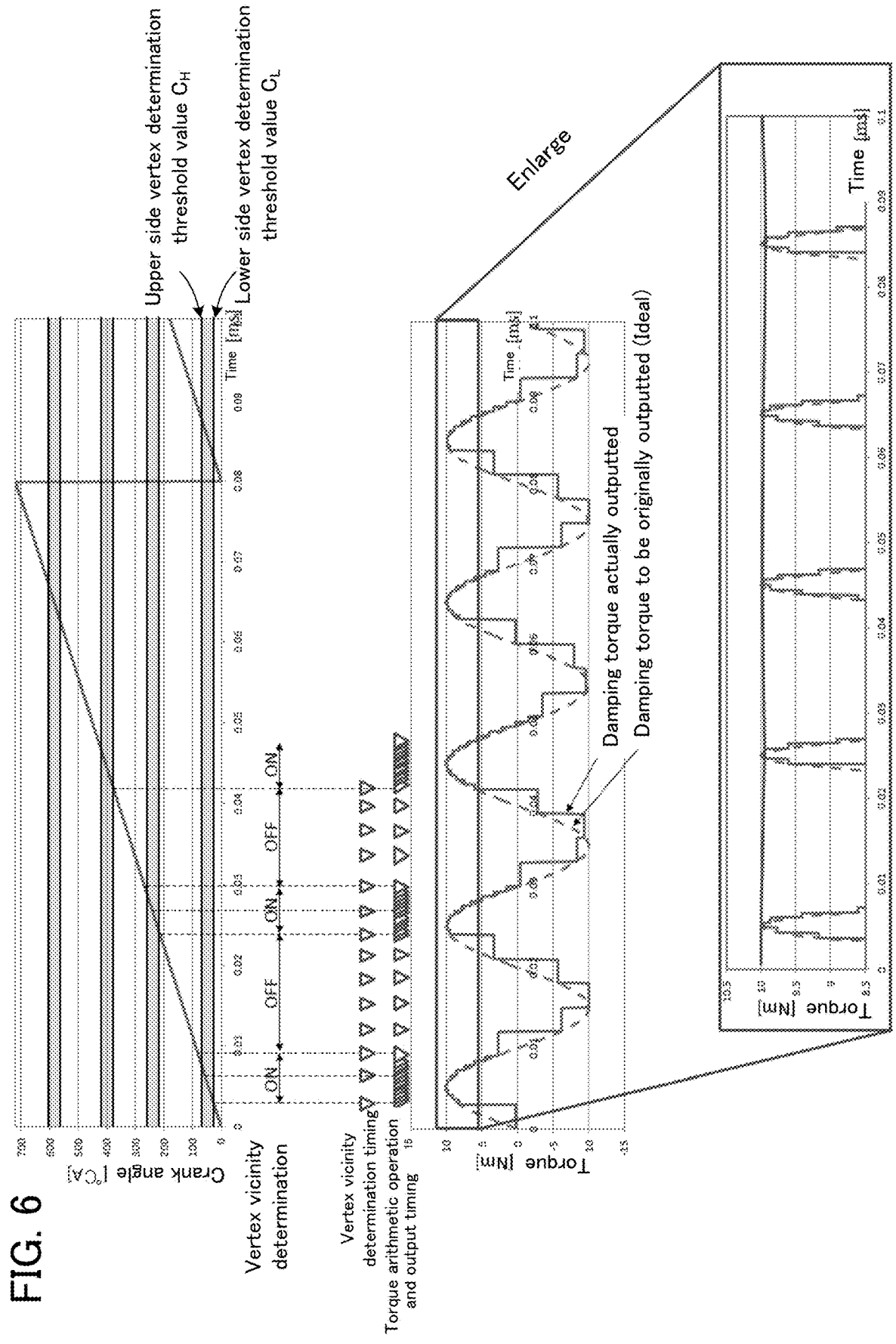
FIG. 6 is a diagram illustrating arithmetic operation and output timing of the damping torque in the control apparatus for the hybrid vehicle according to the first embodiment.

Due to the output command of the arithmetically operated damping torque, a series of process steps performed by the control apparatus for the hybrid vehicle according to the first embodiment is ended. The step S101 may be performed again a predetermined period after the end of the process Effect of Embodiment Next, a technical effect obtained by the arithmetic operation and the output of the damping torque according to the first embodiment described above will be specifically explained with reference to FIG. 6. FIG. 6 is a diagram illustrating arithmetic operation and output timing of the damping torque in the control apparatus for the hybrid vehicle according to the first embodiment.

As illustrated in FIG. 6, in the first embodiment, the damping torque is arithmetically operated and outputted at the low frequency in a period in which the damping torque is not determined to be in the vicinity of the vertex, while the damping torque is arithmetically operated and outputted at the high frequency in the period in which the damping torque is determined to be in the vicinity of the vertex. In other words, in the period in which the damping torque is determined to be in the vicinity of the vertex, the damping torque is arithmetically operated and outputted more frequently than in the other period.

If the calculation cycle of the damping torque is set to be the high-frequency cycle, i.e. if the calculation cycle is shorter, the number of arithmetic operations increases, and the damping torque may be thus more accurately calculated. Thus, the damping torque outputted in the vicinity of the vertex has a shape close to the damping torque to be outputted illustrated in the torque map. As a result, for example, it is possible to prevent the generation of the new frequency component caused by the reduction in the damping torque, for example, as explained in FIG. 3. It is therefore possible to suppress the torque pulsation of the engine 200, and to prevent the vibration of the hybrid vehicle 1.

Moreover, it is only in the period in which the damping torque is in the vicinity of the vertex that the calculation cycle of the damping torque is set to be the high-frequency cycle in the first embodiment. In the other period, the damping torque is arithmetically operated and outputted at the low frequency. It is therefore possible to minimize a processing load increase.

Second Embodiment

Next, a control apparatus for a hybrid vehicle according to a second embodiment will be explained with reference to FIG. 7 and FIG. 8. The second embodiment is different from the first embodiment only in a part of the operation, and is substantially the same as the first embodiment with regard to the other operation and the apparatus configuration. Thus, hereinafter, a different part from the first embodiment already explained will be explained in detail, and an explanation of the same part will be omitted, as occasion demands.

<Explanation of Operation>

The operation of the control apparatus for the hybrid vehicle according to the second embodiment will be explained in detail with reference to FIG. 7. FIG. 7 is a flowchart illustrating a flow of the operation of the control apparatus for the hybrid vehicle according to the second embodiment. In FIG. 7, the same process steps as those in the first embodiment illustrated in FIG. 4 carry the same reference numerals.

Figure 7:
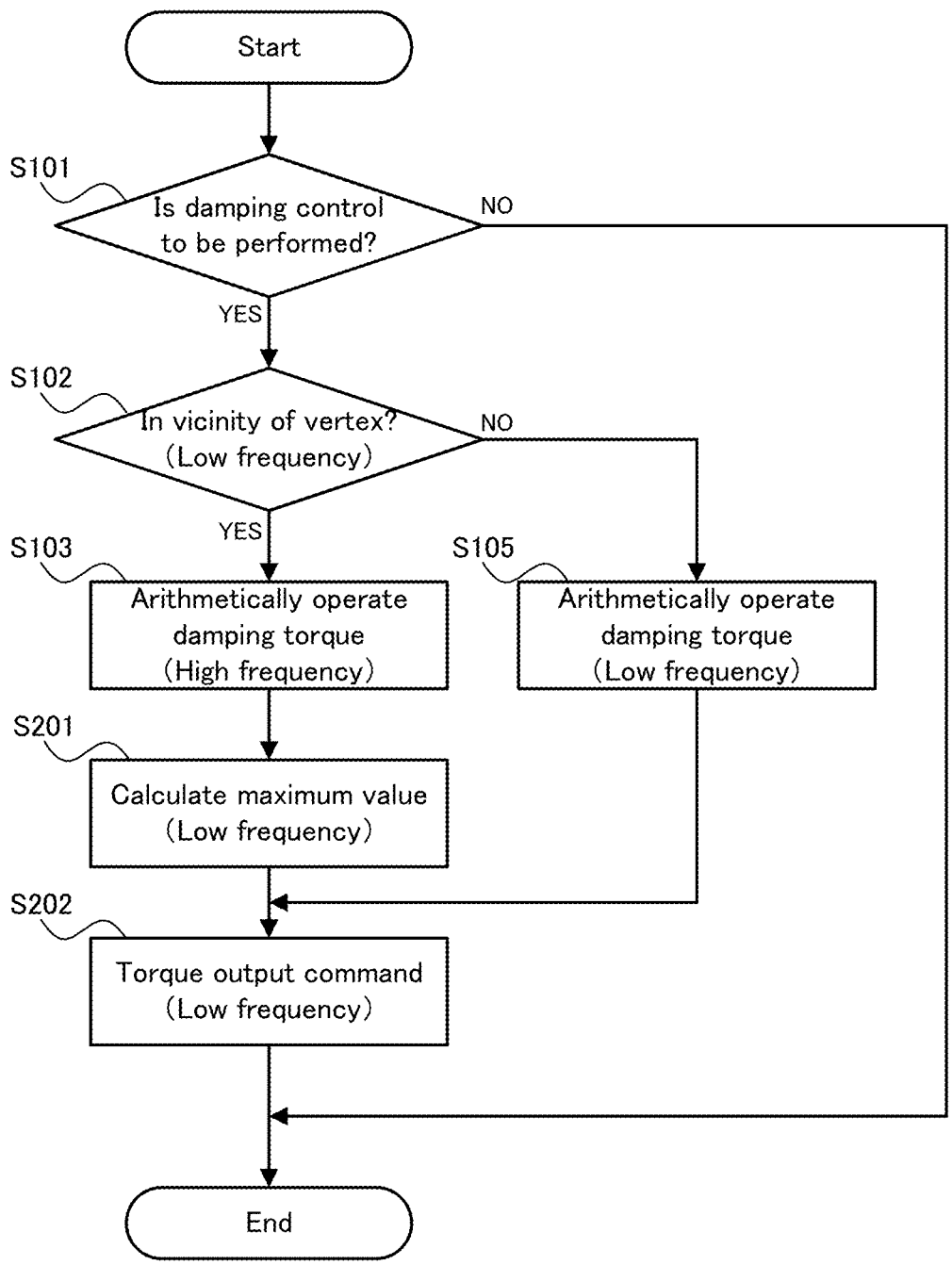
FIG. 7 is a flowchart illustrating a flow of the operation of a control apparatus for a hybrid vehicle according to a second embodiment.

As illustrated in FIG. 7, in operation of the control apparatus for the hybrid vehicle according to the second embodiment, it is firstly determined whether or not the damping control is to be performed (the step S101). If it is determined that the damping control is not to be performed (the step S101: NO), the subsequent process is omitted and a series of process steps is ended. In this case, the process may be restarted from the step S101 after a lapse of a predetermined period.

If it is determined that the damping control is to be performed (the step S101: YES), the vertex determinator 110 determines whether or not the damping torque to be outputted is in the vicinity of the vertex at which the damping torque is locally maximal (the step S102). If it is determined that the damping torque to be outputted is in the vicinity of the vertex (the step S102: YES), the damping torque arithmetic operator 120 arithmetically operates the damping torque at the high frequency (the step S103). On the other hand, if it is determined that the damping torque to be outputted is not in the vicinity of the vertex (the step S102: NO), the damping torque arithmetic operator 120 arithmetically operates the damping torque at the low frequency (step S105).

Here, particularly in the second embodiment, if the damping torque to be outputted is determined to be in the vicinity of the vertex and the damping torque is arithmetically operated at the high frequency, the arithmetically operated damping torque is not outputted as it is, and a maximum value out of a plurality of damping torque values calculated in a period corresponding to a low frequency is calculated (step S201), and the torque controller 130 outputs an output command corresponding to the calculated maximum value at the low frequency (step S202). The low frequency here is one specific example of the "third cycle". The torque controller also outputs the output command at the low frequency, even for a damping torque arithmetically operated at the low frequency when the damping torque to be outputted is determined to be not in the vicinity of the vertex (the step S202).

Due to the output command of the arithmetically operated damping torque, a series of process steps performed by the control apparatus for the hybrid vehicle according to the second embodiment is ended. The step S101 may be performed again a predetermined period after the end of the process.

Effect of Embodiment

Next, a technical effect obtained by the arithmetic operation and the output of the damping torque according to the second embodiment described above will be specifically explained with reference to FIG. 8. FIG. 8 is a diagram illustrating arithmetic operation and output timing of the damping torque in the control apparatus for the hybrid vehicle according to the second embodiment.

Figure 8:
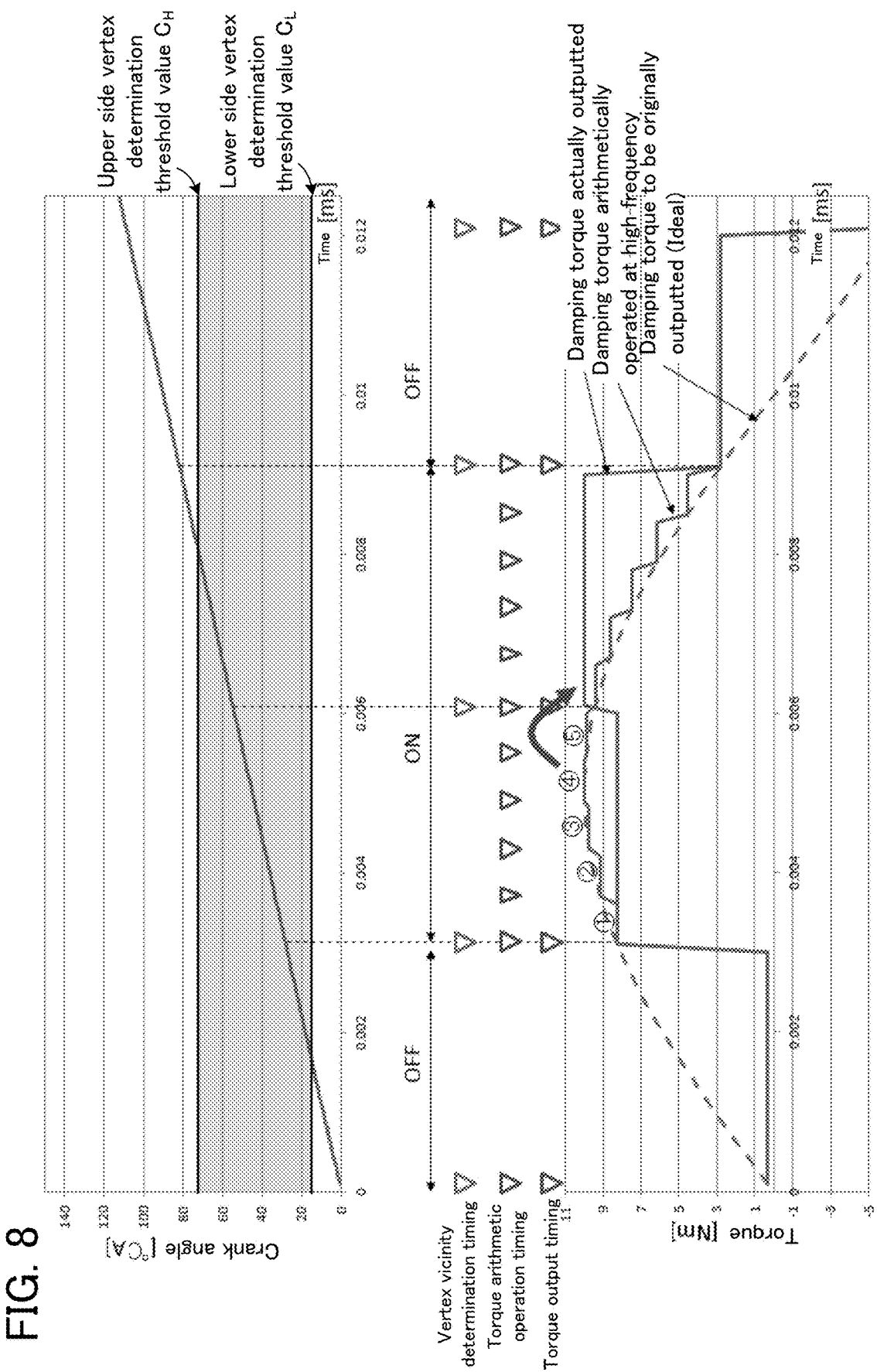
FIG. 8 is a diagram illustrating arithmetic operation and output timing of the damping torque in the control apparatus for the hybrid vehicle according to the second embodiment.

As illustrated in FIG. 8, in the second embodiment, the damping torque is arithmetically operated at the high frequency in the period in which the damping torque is determined to be in the vicinity of the vertex, but a control of outputting the arithmetically operated damping torque is performed at the low frequency. Specifically, the damping torque is not outputted immediately at a time at which the damping torque is arithmetically operated, and the maximum value out of the plurality of values arithmetically operated up to a next output time is outputted as the damping torque at the next output time. In an example illustrated in FIG. 8, a total of five damping torques are calculated between two output times, but each of the damping torques is not outputted immediately, and a maximum value up to a next output time (i.e. a value of the fourth arithmetic operation) is outputted at the next output time.

As described above, the maximum value out of the plurality of damping torques arithmetically operated at the high frequency is outputted, by which it is possible to avoid the reduction in the damping torque and to prevent the fluctuation of the damping torque in each cycle. It is thus possible to prevent the generation of the new frequency component caused by the reduction in the damping torque, for example, as explained in FIG. 3. It is therefore possible to suppress the torque pulsation of the engine 200, and to prevent the vibration of the hybrid vehicle 1.

Moreover, it is only for the torque arithmetic operation in the period in which the damping torque is in the vicinity of the vertex that the calculation cycle of the damping torque is set to be the high-frequency cycle in the second embodiment. The torque output in the period in which the damping torque is in the vicinity of the vertex, and the torque arithmetic operation and the torque output in the other period are performed at the low frequency. It is therefore possible to minimize the processing load increase.

Third Embodiment

Next, a control apparatus for a hybrid vehicle according to a third embodiment will be explained with reference to FIG. 9 to FIG. 11. The third embodiment is different from the first and second embodiments only in a part of the operation, and is substantially the same as the first and second embodiments with regard to the other operation and the apparatus configuration. Thus, hereinafter, a different part from the first and second embodiments already explained will be explained in detail, and an explanation of the same part will be omitted, as occasion demands.

<Explanation of Operation>

The operation of the control apparatus for the hybrid vehicle according to the third embodiment will be explained in detail with reference to FIG. 9. FIG. 9 is a flowchart illustrating a flow of the operation of the control apparatus for the hybrid vehicle according to the third embodiment. In FIG. 9, the same process steps as those in the first embodiment illustrated in FIG. 4 carry the same reference numerals.

Figure 9:
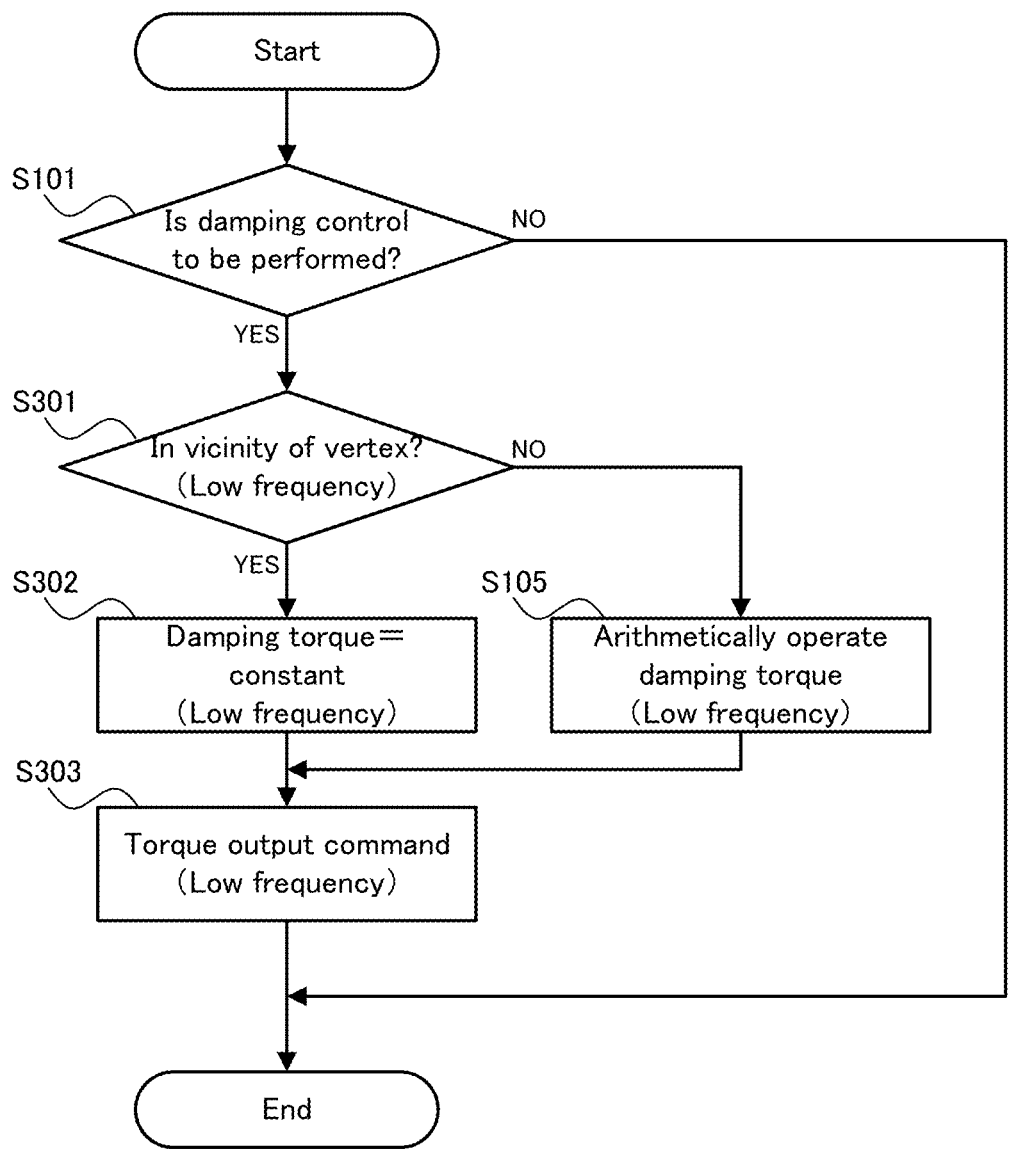
FIG. 9 is a flowchart illustrating a flow of the operation of a control apparatus for a hybrid vehicle according to a third embodiment.

As illustrated in FIG. 9, in operation of the control apparatus for the hybrid vehicle according to the third embodiment, it is firstly determined whether or not the damping control is to be performed (the step S101). If it is determined that the damping control is not to be performed (the step S101: NO), the subsequent process is omitted and a series of process steps is ended. In this case, the process may be restarted from the step S101 after a lapse of a predetermined period.

If it is determined that the damping control is to be performed (the step S101: YES), the vertex determinator 110 determines whether or not the damping torque to be outputted is in the vicinity of the vertex at which the damping torque is locally maximal (step S301). Hereinafter, a method of determining the vicinity of the vertex will be specifically explained with reference to FIG. 10. FIG. 10 is a diagram illustrating the method of determining the vicinity of the vertex of the damping torque according to the third embodiment.

Figure 10:
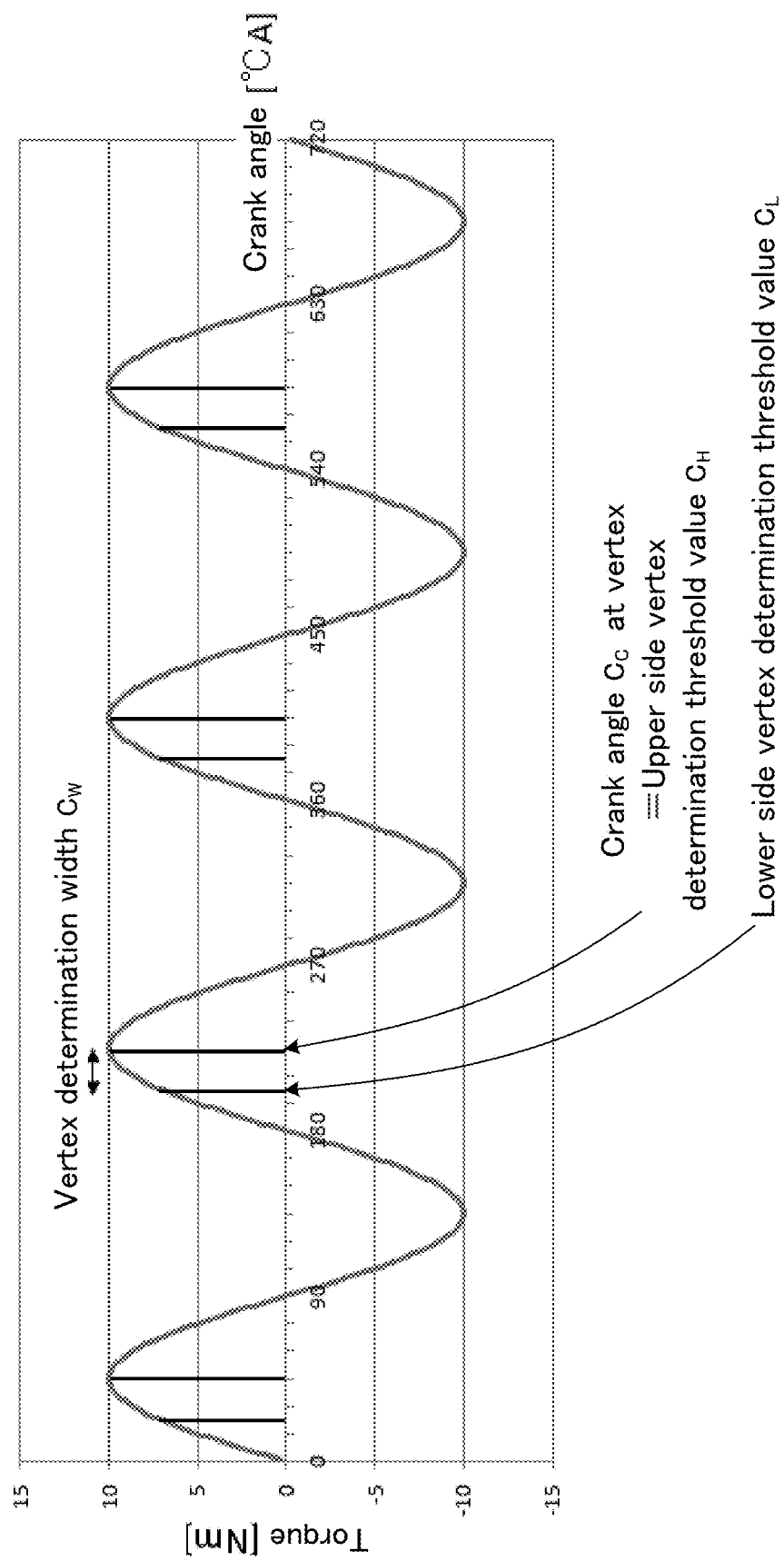
FIG. 10 is a diagram illustrating a method of determining the vicinity of the vertex of the damping torque according to the third embodiment.

As illustrated in FIG. 10, the lower side vertex determination threshold value $C_L$ according to the third embodiment is obtained in the same manner as in the first embodiment (refer to FIG. 5), while the upper side vertex determination threshold value $C_H$ is set as a value equal to the crank angle $C_C$ at which the damping torque is at the vertex. Thus, in the third embodiment, the damping torque is determined to be in the vicinity of the vertex if the current crank angle is greater than or equal to the lower side vertex determination threshold value $C_L$ and if the current crank angle is less than or equal to the crank angle $C_C$ at the vertex (=the upper side vertex determination threshold value $C_H$). On the other hand, the damping torque is determined to be not in the vicinity of the vertex if the current crank angle is less than the lower side vertex determination threshold value $C_L$, or if the current crank angle is greater than the crank angle $C_C$ at the vertex (=the upper side vertex determination threshold value $C_H$).

As described above, in the third embodiment, the determination is performed so that the period in which the damping torque is determined to be in the vicinity of the vertex (i.e. the range of the crank angle) is short. This is because the maximum damping torque is outputted at a time point at which the damping torque is determined to be in the vicinity of the vertex, and it is desired to stop the output of the maximum damping torque as soon as possible after the determination regarding the vicinity of the vertex The vertex determination according to the third embodiment is also performed at the low frequency as in the first embodiment.

Back in FIG. 9, if it is determined that the damping torque to be outputted is not in the vicinity of the vertex (the step S301: NO), the damping torque arithmetic operator 120 arithmetically operates the damping torque at the low frequency (step S105). On the other hand, if it is determined that the damping torque to be outputted is in the vicinity of the vertex (the step S301: YES), the damping torque arithmetic operator 120 calculates the damping torque as a constant (step S302). Specifically, the damping torque arithmetic operator 120 calculates a maximum value of the damping torque to be outputted, illustrated in a torque map (i.e. a maximum value that can be arithmetically operated in a normal damping torque arithmetic operation), as the damping torque at the time point at which the damping torque to be outputted is determined to be in the vicinity of the vertex. In this case, it is not necessary to arithmetically operate the damping torque at the high frequency, and it is sufficient to arithmetically operate it at the low frequency.

The torque controller 130 then outputs an output command corresponding to the arithmetically operated damping torque at the low frequency (step S303). By this, a series of process steps performed by the control apparatus for the hybrid vehicle according to the third embodiment is ended. The step S101 may be performed again a predetermined period after the end of the process.

Effect of Embodiment

Next, a technical effect obtained by the arithmetic operation and the output of the damping torque according to the third embodiment described above will be specifically explained with reference to FIG. 11. FIG. 11 is a diagram illustrating arithmetic operation and output timing of the damping torque in the control apparatus for the hybrid vehicle according to the third embodiment.

Figure 11:
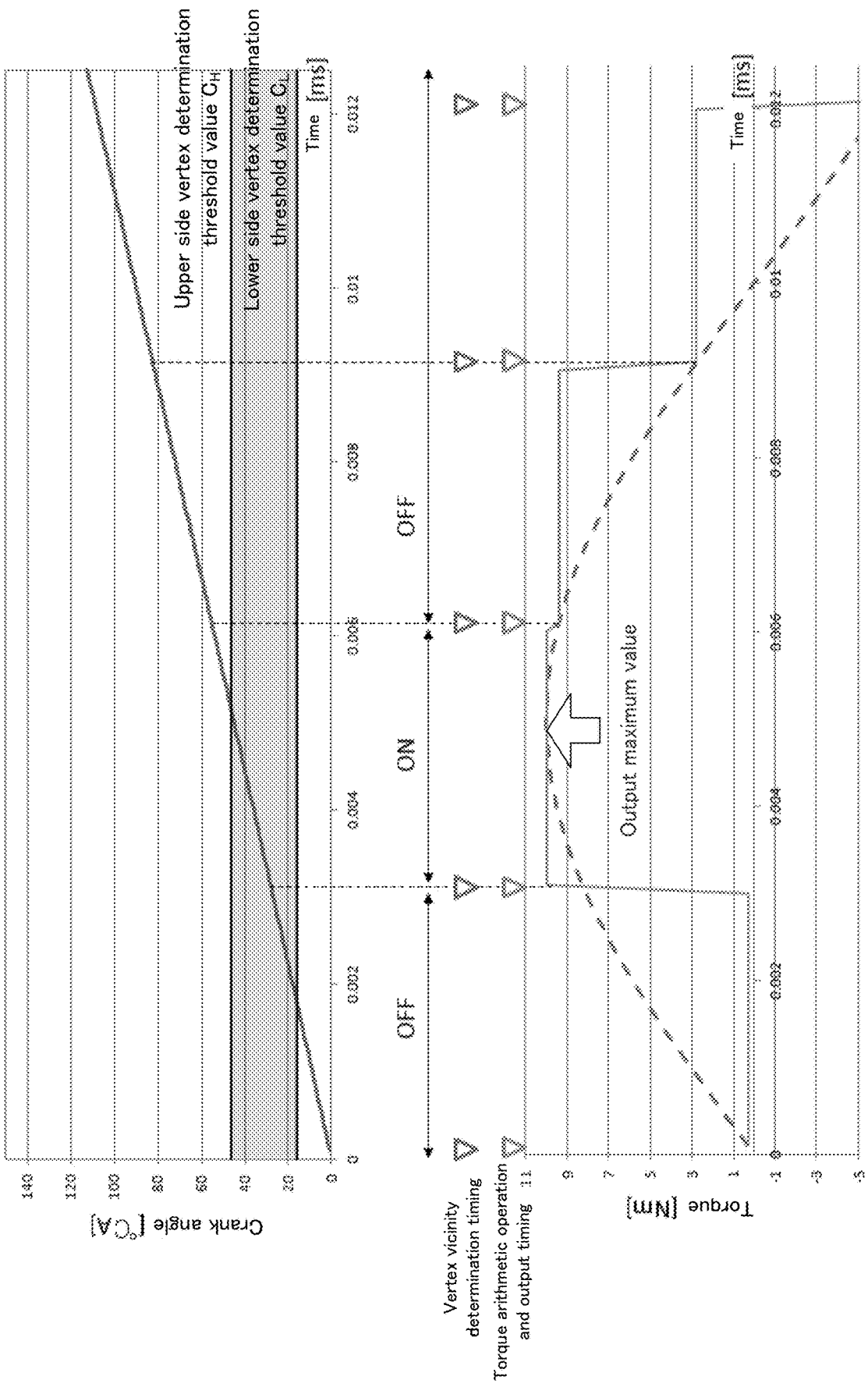
FIG. 11 is a diagram illustrating arithmetic operation and output timing of the damping torque in the control apparatus for the hybrid vehicle according to the third embodiment.

As illustrated in FIG. 11, in the third embodiment, the maximum damping torque that can be arithmetically operated is outputted at the time point at which the damping torque to be outputted is determined to be in the vicinity of the vertex. Therefore, the maximum value of the damping torque in each cycle is constant, and the fluctuation of the damping torque can be certainly prevented. It is thus possible to prevent the generation of the new frequency component caused by the reduction in the damping torque, for example, as explained in FIG. 3. It is therefore possible to suppress the torque pulsation of the engine 200, and to prevent the vibration of the hybrid vehicle 1.

Moreover, in the third embodiment, all the processes are performed at the low frequency, and unlike the first and second embodiments, a part of the arithmetic operation or the output of the damping torque is not performed at the high frequency. It is therefore possible to suppress the aforementioned detrimental effect while avoiding the processing load increase.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come within the meaning and range of equivalency of the claims are therefore intended to be embraced therein.

What is claimed is:

1. A control apparatus for a hybrid vehicle, configured to control the hybrid vehicle, which includes an internal combustion engine as a power source and an electric motor configured to output a torque to an output shaft of the internal combustion engine, said control apparatus comprising:
    an arithmetic operator configured to arithmetically operate a pulsation compensating torque for compensating a pulsation component, which is generated on the output shaft of the internal combustion engine;
    an arithmetic operation controller configured to control said arithmetic operator (i) to arithmetically operate the pulsation compensating torque in a first cycle in a period that does not include a vertex portion in which the pulsation compensating torque is locally maximal or locally minimal and (ii) to arithmetically operate the pulsation compensating torque in a second cycle, a length of which is shorter than that of the first cycle, in a period that includes the vertex portion; and
    a torque controller configured to control the electric motor to output a torque including the pulsation compensating torque arithmetically operated by said arithmetic operator.

2. The control apparatus for a hybrid vehicle of claim 1, wherein said torque controller is configured (i) to control the electric motor in a third cycle including a plurality of second cycles and (ii) to set a maximum value, out of a plurality of pulsation compensating torques respectively arithmetically operated in the plurality of second cycles included in the third cycle, as the pulsation compensating torque and to control the electric motor in the period that includes the vertex portion.

3. A control apparatus for a hybrid vehicle, configured to control the hybrid vehicle, which includes an internal combustion engine as a power source and an electric motor configured to output a torque to an output shaft of the internal combustion engine, said control apparatus comprising:

an arithmetic operator configured to arithmetically operate a pulsation compensating torque for compensating a pulsation component, which is generated on the output shaft of the internal combustion engine;

a torque controller configured to control the electric motor (i) to output a torque including the pulsation compensating torque arithmetically operated by said arithmetic operator in a period that does not include a vertex portion in which the pulsation compensating torque is locally maximal or locally minimal and (ii) to output a torque including the maximum pulsation compensating torque that can be arithmetically operated by said arithmetic operator, in a period that includes the vertex portion.

* * * * *